United States Patent
Wyatt

[11] 3,895,179
[45] July 15, 1975

[54] ALL WEATHER ELECTRICAL POWER SERVICE BOX

[75] Inventor: Robert W. Wyatt, Monrovia, Calif.

[73] Assignee: Unicorn Industries, Anaheim, Calif.

[22] Filed: July 1, 1974

[21] Appl. No.: 484,663

[52] U.S. Cl. .................. 174/50; 317/117; 317/120; 220/3.94
[51] Int. Cl. ............................................. H05k 5/04
[58] Field of Search............. 174/50, 52 R; 317/120, 317/117; 220/3.92, 3.94, 4 R; 200/303; 312/100

[56] References Cited
UNITED STATES PATENTS

| | | | |
|---|---|---|---|
| 2,330,975 | 10/1943 | Jackson | 174/52 R X |
| 2,656,948 | 10/1953 | McGee | 312/100 X |
| 3,361,938 | 1/1968 | Watson | 317/120 |
| 3,584,136 | 6/1971 | Robert | 220/3.94 X |
| 3,585,456 | 6/1971 | Phillips | 317/112 |

Primary Examiner—J. V. Truhe
Assistant Examiner—David A. Tone
Attorney, Agent, or Firm—Christie, Parker & Hale

[57] ABSTRACT

A power service box in which electrical conduit for output power leads may be permanently attached to the bottom of the box, but which provides an alternate pre-wired receptacle outlet on the bottom of the box. A removable panel on the front of the box mounts circuit breakers and may include standard plug-in receptacles. To provide higher capacity plug-in power service using a lock-type plug, the front panel is removed. The bottom of the box is pivoted to fold inside of the box and a new panel is attached to the front of the box having an integral bottom plate on which a lock-type receptacle is mounted, the integral bottom plate combining with the folded bottom to securely close off the box against the weather.

5 Claims, 6 Drawing Figures

PATENTED JUL 15 1975 3,895,179

SHEET 1

ALL WEATHER ELECTRICAL POWER SERVICE BOX

FIELD OF THE INVENTION

This invention relates to all-weather electrical service boxes, and more particularly, is concerned with a box which can be converted to provide a vertically-mounted or horizontally mounted plug-in outlet receptacle.

BACKGROUND OF THE INVENTION

In providing electrical power service centers for mobile homes or other outdoor service, it is desirable to provide service centers which can be easily modified to accommodate different load requirements and different types of power connections. In U.S. Pat. No. 3,585,456, for example, there is shown an arrangement in which the service box is adapted to receive a removable plate which carries one or more plug receptacles and one or more circuit breakers. The panel is pre-wired and input to the service box is provided by bus bars connected to a meter. Contact is made to the bus bars by spring contacts carried on the inside of the panel. Thus one panel can be easily replaced by another panel to provide different service capacities and different outlet receptacle configurations.

In using panel-mounted receptacles, plugs are used in which the plug and cable are molded as a unit with the cable extending perpendicular to the plug. This permits the cable to pass directly down across the face of the panel and allows a cover to be positioned over the front of the panel to shield the receptacle and plug from the weather. However, some loads use plugs requiring a lock-type receptacle. Such plugs also require the cable to extend directly out from the plug to permit locking rotation of the plug. This makes a panel installation undesirable since the cable must extend directly out in a direction perpendicular to the force of the panel. The cover cannot be closed and the receptacle and plug cannot be shielded from the rain.

SUMMARY OF THE INVENTION

The present invention provides an improved electrical power service box which can provide plug-in receptacles on either the front or the bottom of the service box without requiring any rewiring. In brief, this is achieved by providing a service box in which the front panel with its prewired circuit breakers and receptacles is removable. The bottom of the box is in the form of a hinged plate so that, with the panel removed, the bottom plate can be rotated into a vertical position against the back of the box. A replacement panel having an integral plate normal to the bottom edge of the panel with a pre-wired receptacle mounted in the plate replaces the standard panel. The original panel can be re-used by removing the replacement panel and folding the hinged bottom of the service box back into position.

DESCRIPTION OF THE DRAWINGS

For a better understanding of the invention reference should be made to the accompanying drawings, wherein.

DETAILED DESCRIPTION

Figure 1:
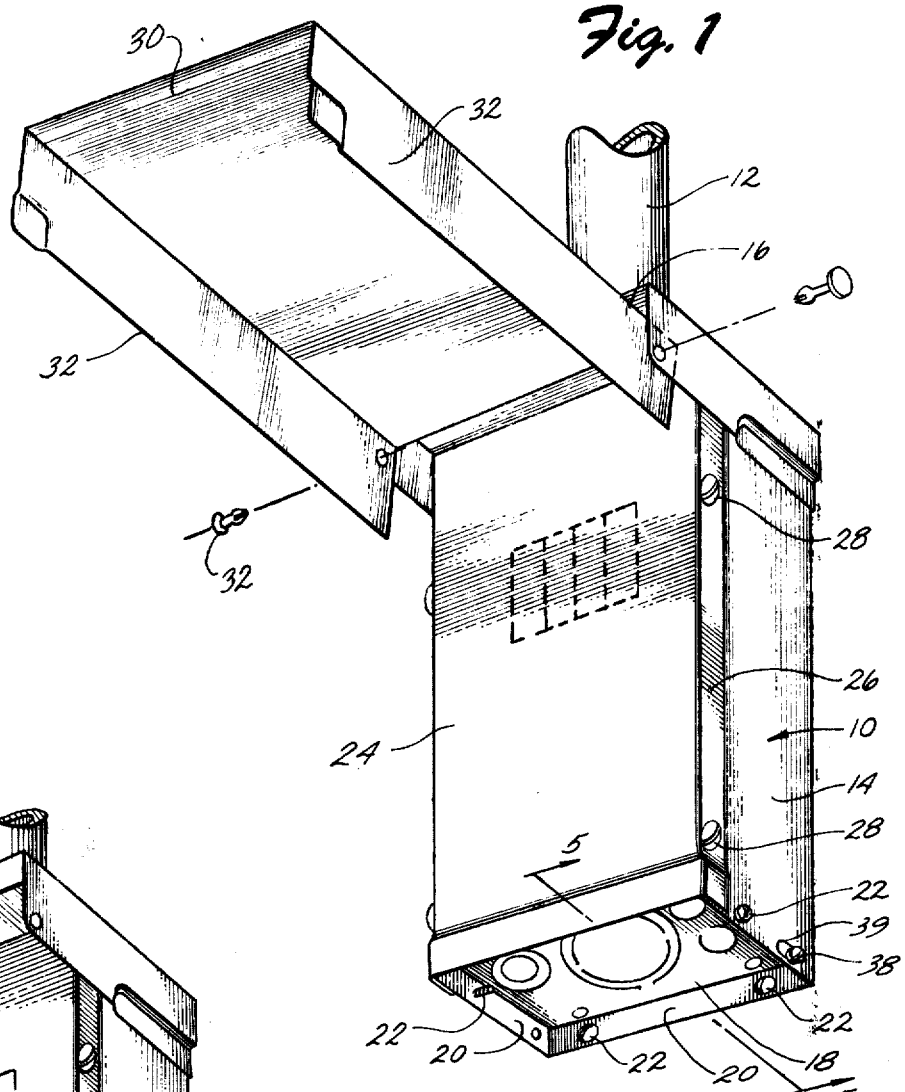
FIG. 1 is a perspective view of a power service with a standard front panel.

Referring to FIG. 1, the numeral 10 indicates generally an electrical power service box which may be mounted on a post, wall or other suitable vertical service. Power lines are brought into the service box from a meter (not shown) through an electrical conduit 12 connected to the top of the box.

The box 10 is constructed of a channel-shaped piece of sheet metal forming the back wall and the two sidewalls, one of which is indicated at 14. The top wall 16 extends over the front of the box to form a hood, with the edges of the top wall being folded down and joined to the sidewalls 14.

A bottom wall 18 is formed with downwardly extending flanges 20 along the back and side edges of the bottom. The edges 20 are fastened to the inside of the back and sidewalls of the box 10 by four sheet metal screws 22. The bottom wall 18 may be provided with standard knock-outs for connecting conduits for the outlet leads from the box where permanent wiring installation is required.

The service box is provided with a standard front panel 24. The edges of the front panel are folded to form flanges 26 which fit over the projecting edges of the sidewalls 14. The panel is held in place by sheet metal screws 28 which pass through the edges 26 and engage the sidewalls to hold the panel in place. The front panel is provided with standard knock-outs for mounting one or more circuit breakers on the inside of the panel in conventional manner. In addition the service box is provided with a front cover 30 which is hinged at the top to the projecting portion of the top wall 16 by pivot pins 32. The cover 30 has sides 33 which fit over the edges 26 of the front panel 24 when the cover 30 is in its closed position. Thus the top and sides of the front panel are protected, leaving an opening through which plug-in cords can pass.

Figure 2:
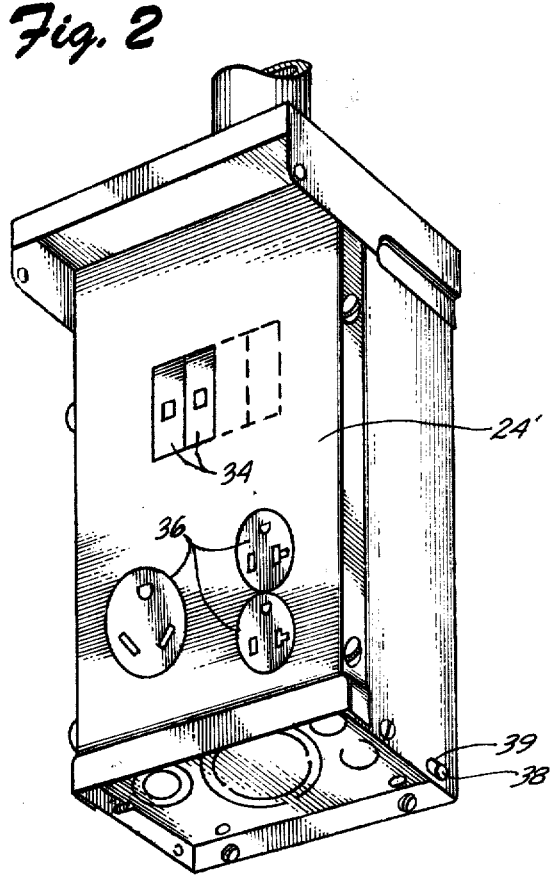
FIG. 2 is a perspective view of the service box with an alternate front panel having plug receptacle outlets.
Figure 5:
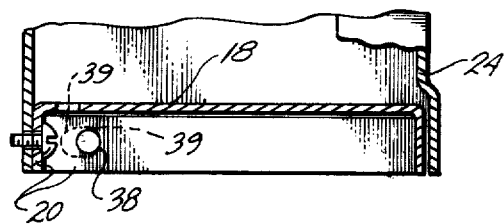
FIG. 5 is a partial sectional view of the bottom of the box in the normal position.
Figure 6:
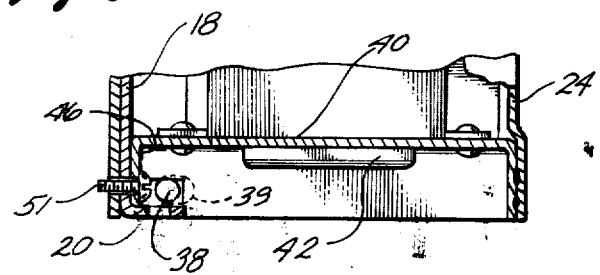
FIG. 6 is a partial sectional view of the bottom of the box in the folded position.
Figure 3:
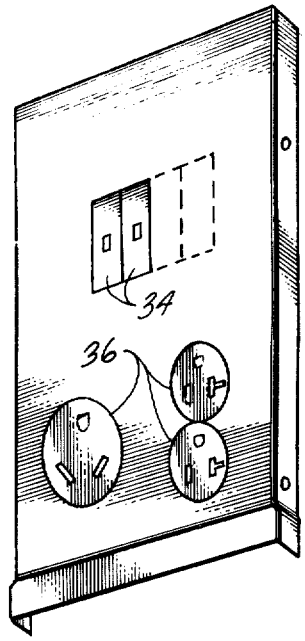
FIG. 3 is a perspective view showing disassembly of the bottom of the service box.
Figure 3:
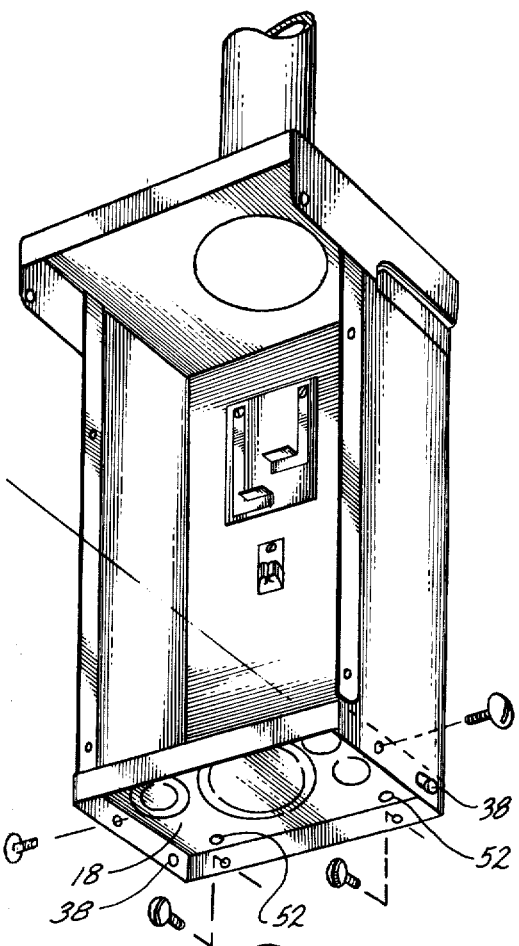

Referring to FIG. 2, the front panel 24 can be removed by loosening the screws 28. A pre-wired power outlet panel 24' having circuit breakers 34 and standard power receptacles 36 can be mounted in place of the panel 24. The circuit breakers 34 have spring terminals which stab-connect onto bus bars inside the box to complete electrical connection of the breakers and receptacles to the power source, in the manner described in detail in the above-identified patent. Thus the service box can be converted to provide standard plug-in service such as is required in new construction locations, or to provide service to motor homes or motor vehicles and the like.

For even higher capacity operation, or for operation with equipment utilizing locking type receptacles, it is desirable that the heavier cable plug into the service box on the bottom rather than the front of the box. To convert the service box to accommodate a locking-type plug on the bottom of the box, the front panel is removed. The sheet metal screws 22 which hold the bottom 18 in place are then removed. However, the bottom 18 remains attached to the sidewalls 14 of the box 10 by a pair of pivot pins 38 which extend through holes 39 in the sidewalls 14 and are secured to the side flanges 20 of the bottom 18 adjacent the back wall of the box. The bottom 18 can be rotated upwardly about the pivot pins 38 into the dotted position shown in FIG. 4. The hole in the sidewalls 14 of the box 10 through which the pivot pins 38 pass may be slightly elongated horizontally, permitting the bottom to be moved laterally outwardly enough so that the bottom will freely rotate from the horizontal to the vertical position.

Figure 4:
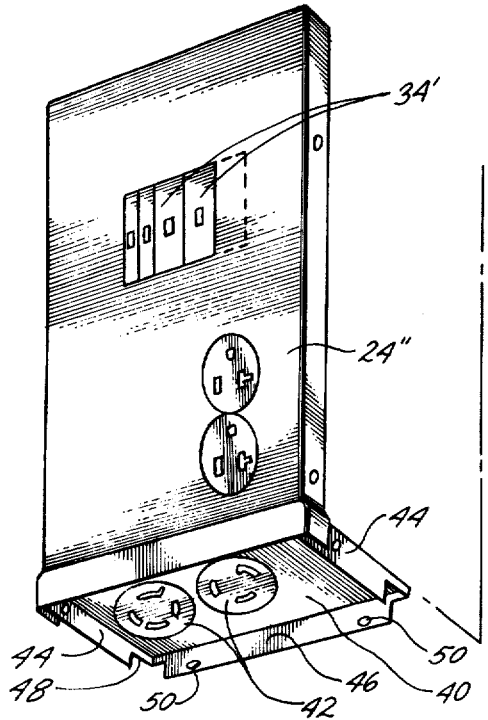
FIG. 4 is a perspective view showing the installation of an alternate panel with bottom receptacle.
Figure 4:
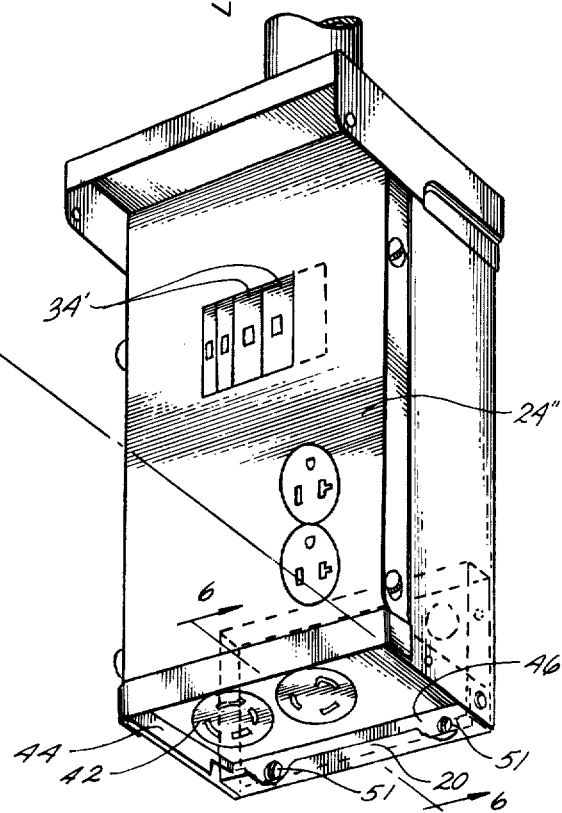

With the bottom 18 rotated up inside the box against the back wall (the dotted position of FIG. 4), a replacement panel 24″ can be attached to the service box 10. The replacement panel 24″ has a rigidly attached bottom panel 40 which extends at right angles to the front panel 24″ along the bottom edge thereof. The bottom panel 40 is provided with one or more lock-type receptacles 42 which are pre-wired to the circuit breakers 34′ mounted on the front panel 24″. The bottom panel 40 is provided with downwardly extending side flanges 44 and a back flange 46. The inner corners of the flanges 44 and the corners of the flange 46 are cut away, as indicated at 48, to permit the bottom panel 40 to fit inside the lower end of the box 10 and extend between the side flanges 20 of the folded up bottom 18, as shown in FIG. 4. With the front panel 24′ in place on the front of the box 10, the bottom panel 40 extends across the bottom of the service box with the back flange 46 fitting against the inside of the folded bottom 18. A pair of sheet metal screws 50 pass through holes 52 in the back flange 46 of the bottom panel 40 and through aligned holes 53 in the folded bottom 18 to threadedly engage the back wall of the service box. Thus the bottom panel 40 clamps the bottom 18 in the vertical position against the inside of the back wall where it is available for future use in the event the service box 10 is converted back to either of the arrangements shown in FIG. 1 or FIG. 2.

What is claimed is:

1. An electrical junction box comprising a sheet metal housing having integral back and sidewalls, means forming a top wall, and a movable bottom wall including a flat portion, hinge means rotatably securing the bottom wall to the sidewalls adjacent the back wall, the flat portion of the bottom wall rotating between a normal position perpendicular to the back wall to a folded position parallel to and against the back wall, and a removable front panel mounted between the sidewalls.

2. The apparatus of claim 1 wherein the front panel includes an integral bottom panel projecting inwardly from the lower end of the front panel, the bottom panel having a flat portion normal to the front panel terminating in an inner edge, the bottom wall being held in folded position against the back wall by the inner edge of the bottom panel.

3. The apparatus of claim 2 wherein the bottom panel includes a receptacle for an electrical plug connector.

4. The apparatus of claim 2 wherein the bottom panel includes a flange along the inner edge, and means securing the flange to the back wall of the box through the flat portion of the folded bottom wall.

5. The apparatus of claim 1 wherein the bottom wall includes flanges along the sides and back edges of the flat portion, and means securing the flanges to the side and back walls when the bottom wall is in the normal position.

* * * * *